J. R. TILLEY.
CULTIVATOR.

No. 190,796. Patented May 15, 1877.

WITNESSES:
H. Rydquist
J. H. Scarborough

INVENTOR:
John R. Tilley.
BY Munn & Co.
ATTORNEYS.

N. PETERS, PHOTO-LITHOGRAPHER, WASHINGTON, D. C.

UNITED STATES PATENT OFFICE.

JOHN RHODES TILLEY, OF DEMERARA, BRITISH GUIANA, SOUTH AMERICA.

IMPROVEMENT IN CULTIVATORS.

Specification forming part of Letters Patent No. 190,796, dated May 15, 1877; application filed October 7, 1876.

*To all whom it may concern:*

Figure 1:
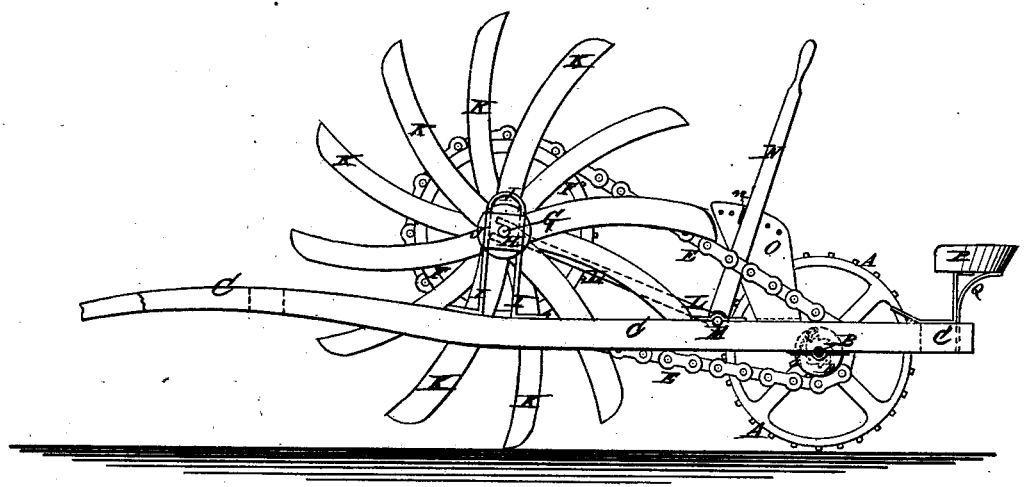
Figure 2:
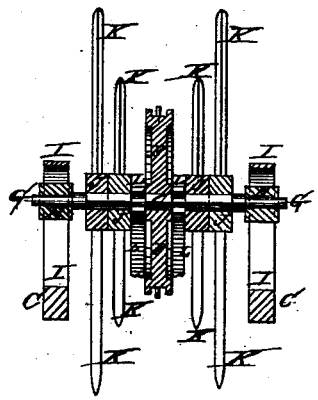

Be it known that I, JOHN R. TILLEY, of Demerara, British Guiana, South America, have invented a new and Improved Self-Clearing Cultivator, of which the following is a specification:

Figure 1 is a side view of my improved cultivator, one of the drive-wheels being removed. Fig. 2 is a vertical cross-section of the same, taken through the line $x\ x$, Fig. 1.

The invention will first be described in connection with the drawing, and then pointed out in the claims.

A are the drive-wheels, which revolve upon the journals of the axle B, and are connected with said axle by pawls and ratchet-wheels, so that they may carry the said axle with them in their forward revolution, but may turn backward freely. The axle B revolves in bearings attached to the side bars C, which are connected by cross-bars, and are extended forward to serve as shafts for the attachment of the horse. To the center of the axle B is attached a small chain-wheel, D, around which passes an endless chain, E, which also passes around a large chain-wheel, F, attached to the center of the shaft G.

The shaft G revolves in bearings H, that slide up and down in slotted standards or brackets I, attached to the side bars C. Upon the shaft G, at each side of the chain-wheel F, are secured two or more hubs, J, upon which are formed, or to which are attached radially, the shanks of a number of plows or teeth, K. The plows or teeth K are arranged to alternate with each other, so that one or more of them may always be working in the ground.

With this construction, as the machine is drawn forward, the plows will also be drawn forward through the ground to do their work, and at the same time will have a slow rearward revolution, so that the rear plows will always be rising out of the ground, to allow grass, weeds, and other rubbish to slip off them, while the forward plows will always be descending to take their places and do the work.

By this arrangement the plows will clear themselves, and cannot become clogged, and no part of the ground can be left uncultivated.

L are two levers, the forward ends of which are forked, and ride upon the shaft G, and their rear ends are rigidly attached to a shaft, M. The shaft M works in bearing attached to the side bars C, and to its middle part is rigidly attached a lever, N. The levers L L N and the shaft M thus act as a bent lever, to enable the plows to be raised from and lowered to the ground, and adjusted to work at any desired depth in the ground. The lever N moves along a catch-plate, O, attached to the frame C, and in which are formed a number of holes to receive a pin, $n'$, to hold the lever in any position into which it may be adjusted. P is the driver's seat, the standard Q of which is attached to the rear cross-bar of the frame C.

Having thus described my invention, what I claim as new, and desire to secure by Letters Patent, is—

1. The long cutting-knives K and hubs J on shaft G, having large chain-wheel F, and made free to rise and fall in slotted bearings, in combination with the small bearing-wheels A and axle B, having the small chain-wheel D and the endless chain E, whereby the knives are given a slow rearward motion beside that caused by the forward progress of the machine.

2. The combination of lever N, rock-shaft M, and slotted arms L L with the shaft G, that carries the plows, sliding bearings H, slotted brackets I, and the frame C, substantially as herein shown and described, for the purpose specified.

JOHN RHODES TILLEY.

Witnesses:
THOMAS MURDOCH,
N. F. BURKE.